United States Patent [19]
Van Seters et al.

[11] Patent Number: 5,978,378
[45] Date of Patent: Nov. 2, 1999

[54] METHOD AND APPARATUS FOR VLAN SUPPORT

[75] Inventors: Stephen L. Van Seters, Stow, Mass.;
Ryan T. Ross, Londonderry, N.H.;
Leonard Schwartz, Bedford, Mass.;
David C. Ready, Londonderry, N.H.;
John A. Flanders, Ashland, Mass.;
Robert P. Ryan, Marlboro, Mass.;
William D. Townsend, Groton, Mass.

[73] Assignee: 3COM Corporation, Santa Clara, Calif.

[21] Appl. No.: 08/927,641

[22] Filed: Sep. 11, 1997

[51] Int. Cl.[6] .................................................. H04L 12/28
[52] U.S. Cl. ........................................ 370/401; 370/402
[58] Field of Search ............................. 370/401, 402, 370/403, 404, 392, 432, 469, 389

[56] References Cited

U.S. PATENT DOCUMENTS

| | | | |
|---|---|---|---|
| 4,933,937 | 6/1990 | Konishi | 370/404 |
| 5,140,585 | 8/1992 | Tomikawa | 370/447 |
| 5,394,402 | 2/1995 | Ross | 370/402 |
| 5,450,407 | 9/1995 | Perlman | 370/392 |
| 5,684,800 | 11/1997 | Dobbins | 370/401 |
| 5,742,604 | 4/1998 | Edsall | 370/401 |

*Primary Examiner*—Ajit Patel
*Assistant Examiner*—Ricardo M. Pizarro
*Attorney, Agent, or Firm*—Weingarten, Schurgin, Gagnebin & Hayes LLP

[57] ABSTRACT

Logic circuits are employed in a telecommunications bridge/router device to examine a received frame to determine which VLAN, if any, the frame is associated with. The protocol type, receive port identification, and receive VLAN tag are employed to determine the transmit port identification and transmit VLAN tag. A predefined table indicates which ports within the bridge/router are associated with the VLAN. The frame is excluded from transmission through the ports that are not associated with members of the respective the VLAN.

10 Claims, 5 Drawing Sheets

METHOD AND APPARATUS FOR VLAN SUPPORT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Telecommunications networks facilitate exchange of voice, video and computer data. Local area networks ("LANs") of devices may be formed within a telecommunications network in order to increase network bandwidth usage efficiency by segregating network traffic within such a LAN. In particular, a group of devices in relatively close physical proximity and sharing a common administrative purpose may be designated as members of a LAN.

More recently, virtual LANs ("VLANs") have been developed. In a VLAN, devices that are not in relatively close physical proximity belong to a common network that is analogous to a LAN. However, unlike LANs, VLANs contain broadcast and multicast traffic within a predefined group to limit unnecessary bandwidth use in the overall network. Data units that are associated with a VLAN are identified by a field located at layer-3 of the header of each such data unit. In particular, data transmitted from a member of the VLAN to another member of the VLAN may contain VLAN tag indicators that allow the data to be easily filtered outside of the VLAN, thereby reducing superfluous network traffic. While this distinguishing feature allows devices that are not in close proximity to be members of a common VLAN, examination and processing of layer-3 header information is time consuming and processor intensive. A more efficient method and apparatus for supporting VLAN operation would therefore be desirable.

BRIEF SUMMARY OF THE INVENTION

In accordance with the present invention a bridge/router device has logic circuits which examine a received data unit to determine whether the data unit is associated with a VLAN. The logic circuits employ the receive port number, the protocol type and, if present, a receive VLAN tag to determine the transmit VLAN tag. A predefined table that indicates which ports within the bridge/router are associated with the VLAN is then consulted, and the frame is excluded from transmission through ports that do not have destination devices associated with the VLAN.

Analysis of layer-3 header information by logic circuits for support of VLANs improves performance. Software based analysis techniques are known, but are cumbersome and processor intensive. The logic circuits of the present invention analyze layer-3 header information at speeds approximating frame reception rate, and can simultaneously operate upon a plurality of data units. Hence, VLAN support is provided without degradation of bridge/router performance. The logic circuits may also be employed to prevent leakage across VLANs, execute VLAN tag translation, and implement multiple virtual bridging.

BRIEF DESCRIPTION OF THE DRAWING

The invention will be more fully understood in view of the following Detailed Description of the Invention, in conjunction with the Drawing, of which.

DETAILED DESCRIPTION OF THE INVENTION

Figure 1:
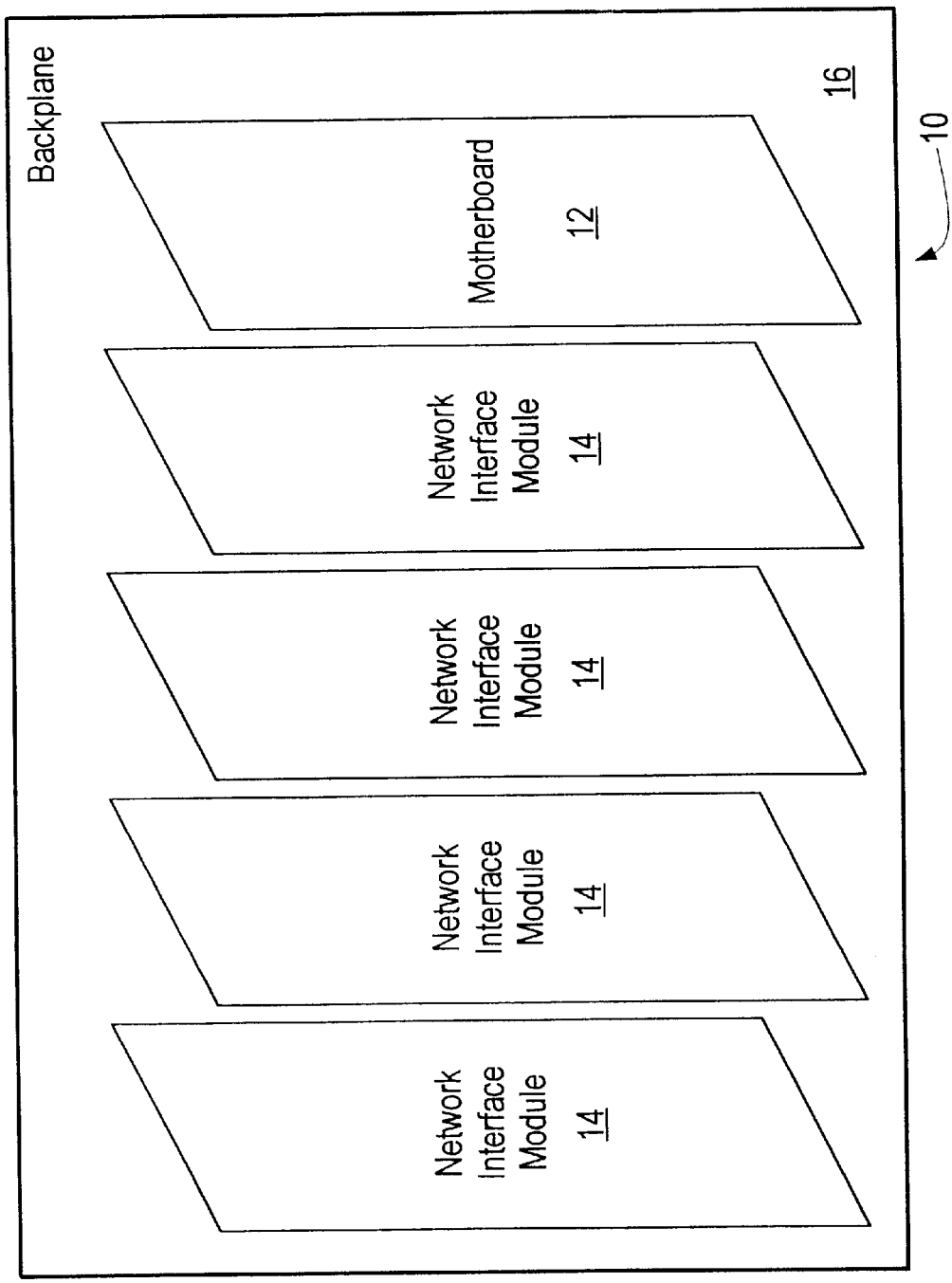
FIG. 1 is a block diagram of a telecommunications bridge/router.
Figure 2:
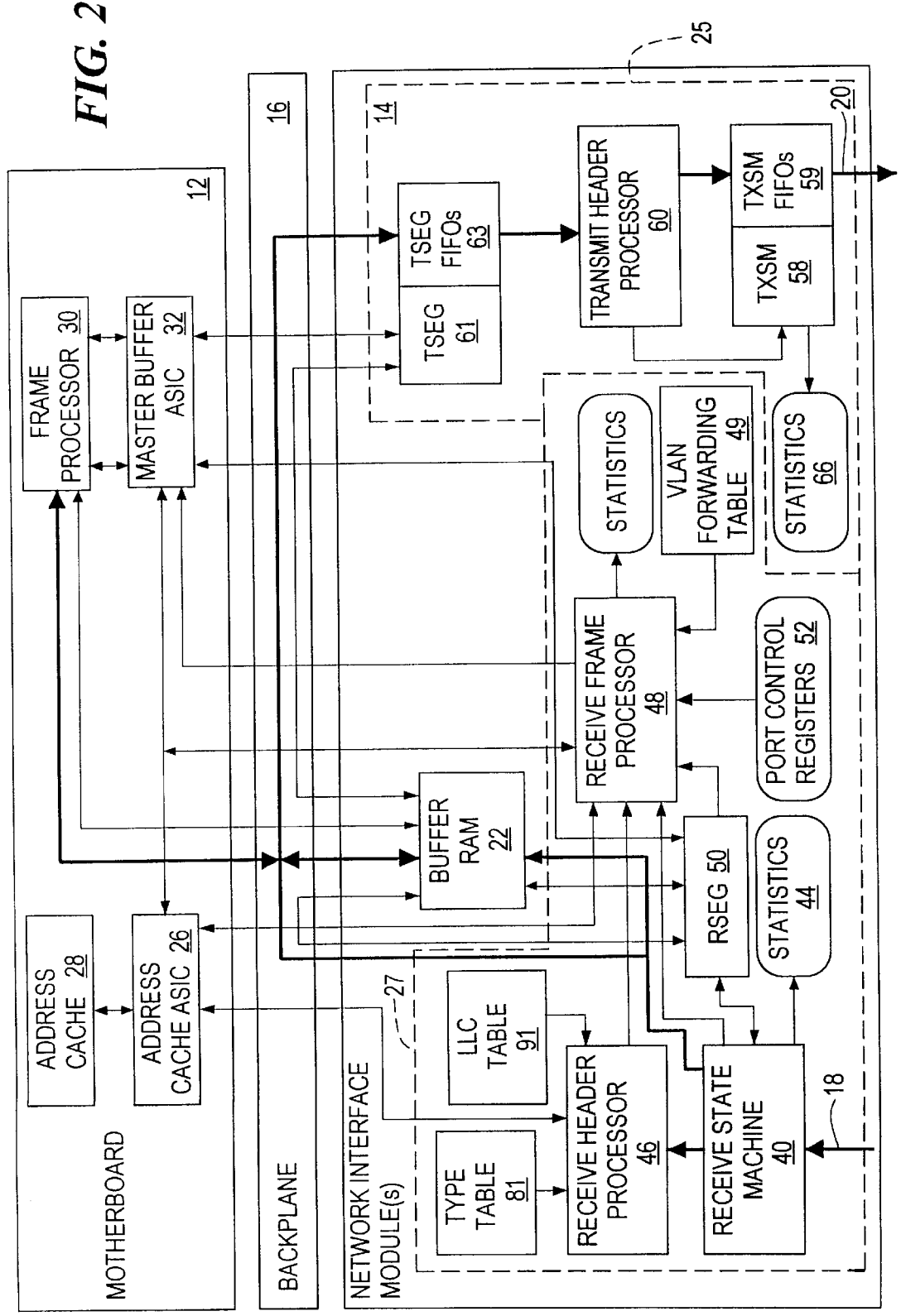
FIG. 2 is a block diagram which illustrates the motherboard and network interface modules of FIG. 1.

Referring to FIGS. 1 and 2, a bridge/router for use in a telecommunications network includes a motherboard 12 and at least one network interface module 14 which are interconnected through a backplane 16. Separate interface modules support Ethernet, Fiber Distributed Data Interface ("FDDI") and Asynchronous Transfer Mode ("ATM") traffic. In one embodiment each 10/100 Mb Ethernet interface module has six ports, each gigabit Ethernet interface module has one port, each FDDI interface module has six ports and each ATM interface module has two OC3 ports or one OC12 port. The ports provide connections to other devices in the network, through which data units can be received and transmitted. Incoming data units may be bridged, routed, translationally bridged and filtered by the bridge/router. Logic circuits in the motherboard and interface modules are responsible for data unit reception and transmission, parsing Data Link and Network Layer headers, looking up source and destination Media Access Control ("MAC") and Network Layer addresses and making forwarding decisions.

The motherboard 12 includes an Address Cache ASIC ("ACA") 26 with associated address cache memory 28, a Frame Processor ("FP") 30 and a Master Buffer ASIC ("MBA") 32. The Address Cache ASIC 26 is responsible for performing cache 28 lookups on Destination Addresses ("DAs") and Source Addresses ("SAs"). The Address Cache ASIC is employed to obtain MAC addresses for bridging support and Network Layer addresses for routing support. The Master Buffer ASIC 32 is responsible for data buffer management in buffer RAM 22.

Each network interface module includes buffer RAM 22, a Transmit ASIC ("TA") 25 and a Receive ASIC ("IRA") 27. The Transmit ASIC and Receive ASIC are specific to the type of data traffic which the network interface device is designed to support (such as Ethernet, ATM and FDDI). The Receive ASIC 27 functions to perform a preliminary analysis on incoming data units. The Transmit ASIC 25 functions to transmit data units.

The Receive ASIC 27 includes a Receive State Machine ("RXSM") 40, a Receive Header Processor ("RHP") 46 and a Receive Frame Processor ("RFP") 48. The Receive State Machine is responsible for receiving data units through one or more ports from an associated communications Link. After receiving a data unit, the Receive State Machine 40 generates data unit status information. The status information, which contains error information and byte and frame count data on a per port basis, is stored in registers 44. The Receive Header Processor 46 is responsible for identifying data units to be bridged or routed, determining inbound data unit encapsulation type, and performing protocol specific processing for routed data units. The Receive Header Processor also determines which VLAN, if any, each incoming frames is received on. There are different versions of Receive Header Processors 46 for different network interface types, e.g., Ethernet, FDDI and ATM. The Receive Header 35 Processor 46 is primarily implemented in microcode. A Receive Segmentation DMA controller ("RSEG") 50 controls storage of received data units within appropriate buffer RAM 22 locations and forwards status information to the Receive Frame Processor 48. Information in a VLAN forwarding table 49 is employed by the Receive Frame Processor 48 to verify if the data unit is allowed to be forwarded through the outbound interface. In particular, the Receive Frame Processor 48 is responsible for making forwarding decisions based on information supplied by the Receive Header Processor 46, Address Cache ASIC 26, Receive State Machine 4D, the RSEG 50 and VLAN configuration information contained in configuration tables associated with the Receive Frame Processor. The Receive Frame Processor 48 also generates Transmit Vectors for data units being processed in hardware over a fast processing path and Receive Vectors for data units being passed to the Frame Processor 30 software for further processing over a slower path. The Receive Frame Processor 48 is implemented partially in microcode.

The Transmit ASIC 25 includes a Transmit State Machine ("TXSM") 58, a plurality of Transmit State Machine FIFOs 59, and a Transmit Header Processor ("THP") 60. A Transmit Segmentation Controller ("TSEG") 61 serves to move data unit segments from locations within the Buffer RAM 22 into an input FIFO designated as the TSEG FIFO 63, which comprises an input FIFO to the Transmit Header Processor 60. The Transmit Header Processor 60 performs any necessary header translations and, upon completion of such translations, moves the translated header to the Transmit State Machine FIFO 59. The Transmit Header Processor 60 also inserts VLAN tags into frames as necessary. Data units are forwarded from the Transmit State Machine FIFO 59 over the respective output port 20 of the network interface module 14. The Transmit State Machine 58 is responsible for controlling transmission of data units from the respective output port 20. Following transmission, the Transmit State Machine generates data unit transmit status information which is stored in registers 66. The status information includes error information and transmit byte and frame count information on a per port basis. Different versions of the Transmit State Machine 58 are provided for different network interface module types, e.g., Ethernet, FDDI and ATM.

Figure 3:
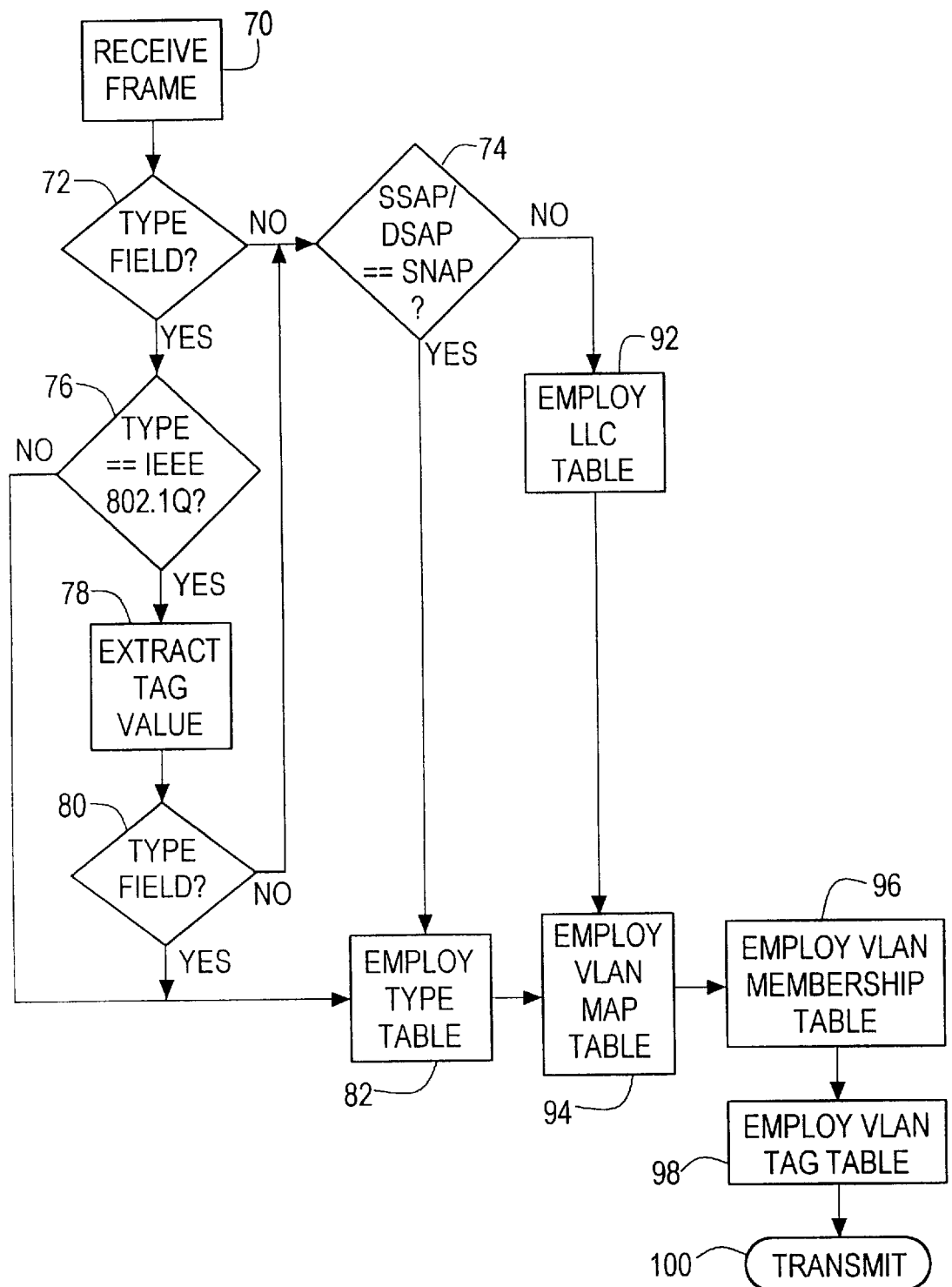
FIG. 3 illustrates data unit processing by logic circuits in conjunction with a network interface card configured for Ethernet type traffic and VLAN support.
Figure 4A:
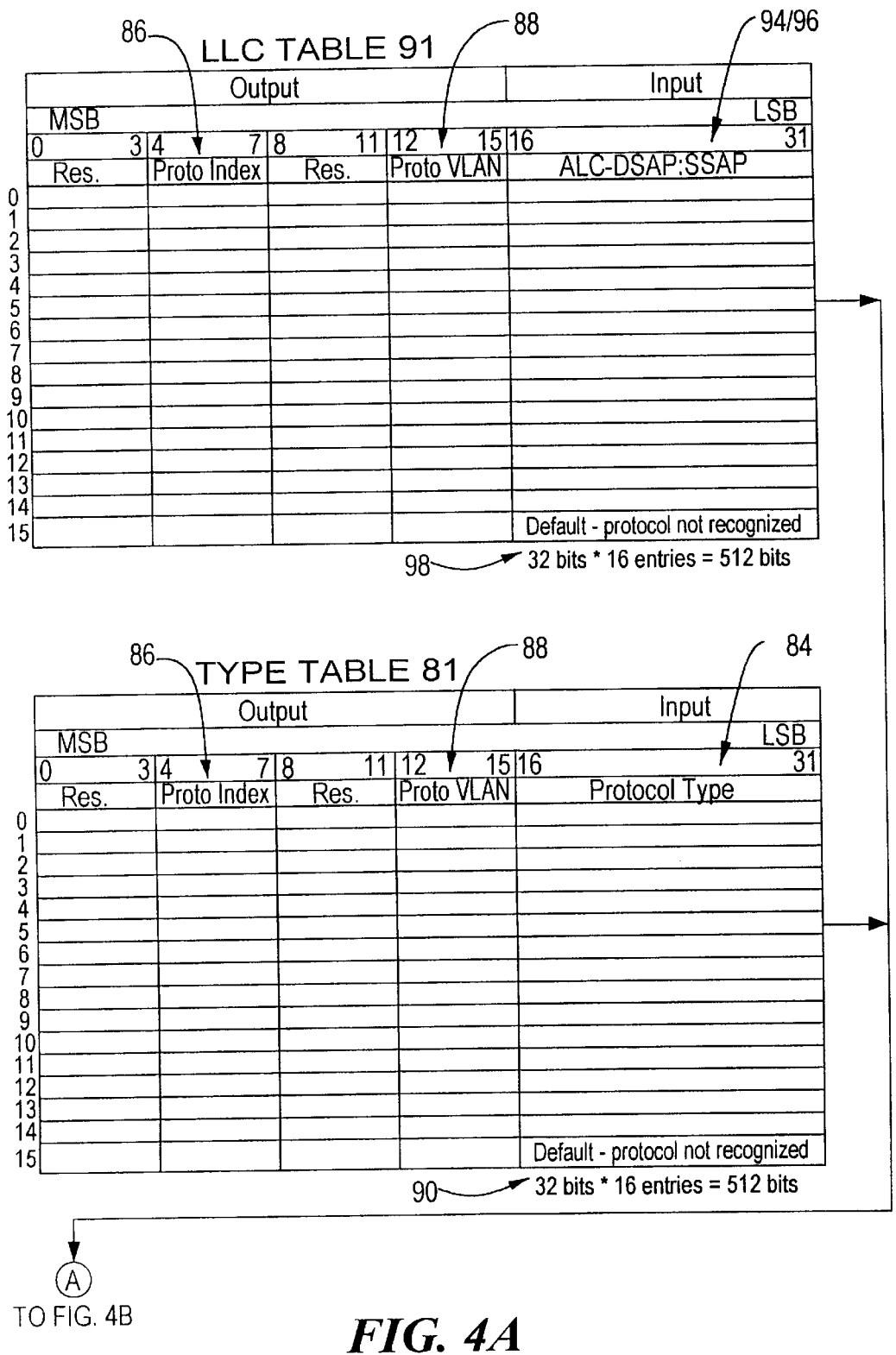
FIG. 4 illustrates memory tables employed by the logic circuits for VLAN support.
Figure 4B:
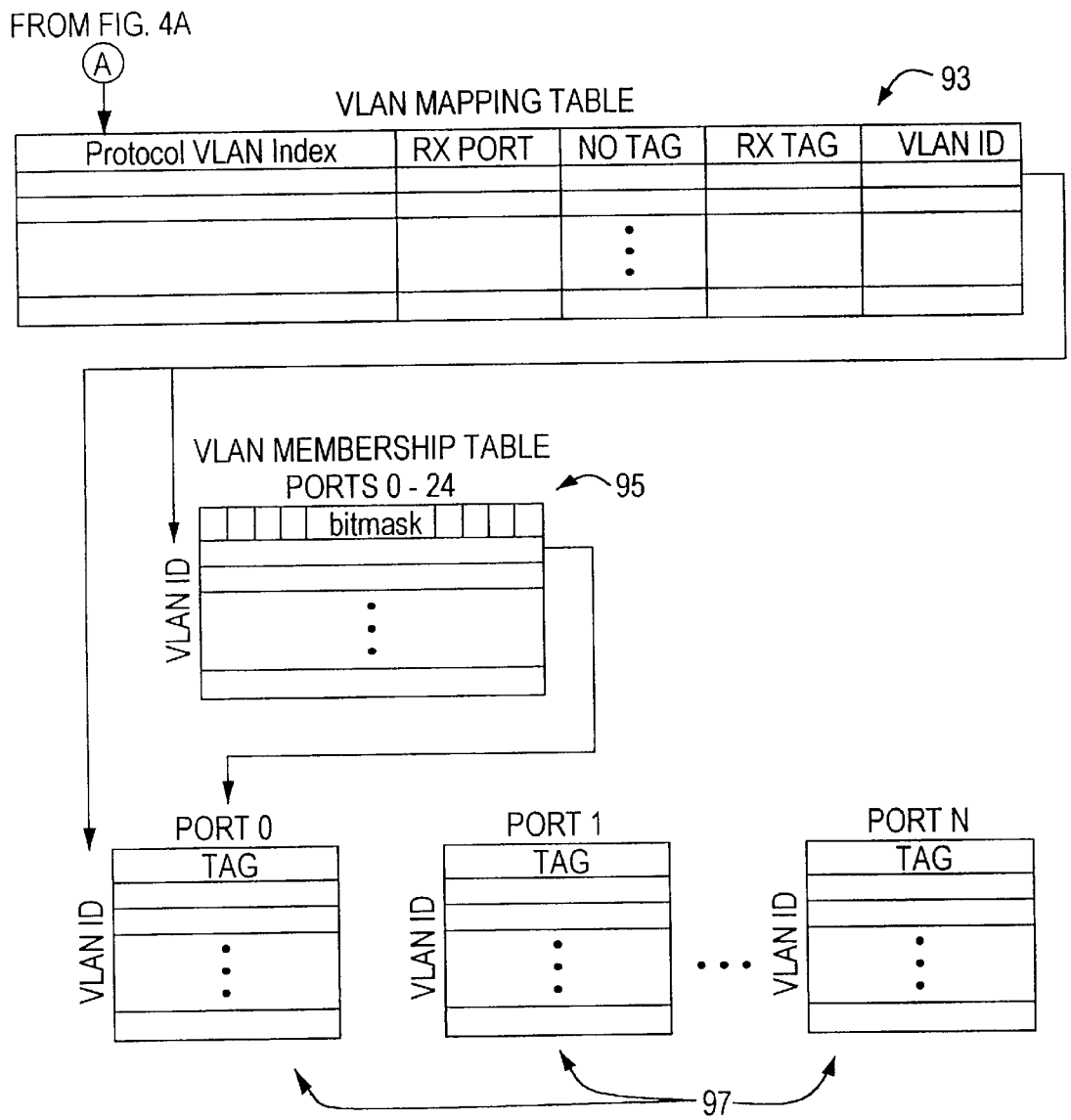

FIGS. 3 and 4 illustrate hardware based processing in logic circuits in a network interface module 14 configured for Ethernet traffic. When an Ethernet frame header is received in the bridge/router at the Receive Header Processor 46 as shown in step 70, the Layer-2 header of the frame is examined as shown in steps 72, 74, 76, 78, and 80. Given a header with the format: Destination Address ("DA")/ Source Address ("SA")/Type (e.g., IPv4, Appletalk, et.)/ Layer-3Header, the Receive Header Processor 46 will first examine the location of the Type/Length field as shown in step 72. In particular, the value of the field following the SA field is compared with the predetermined value (1500) above which the field is determined to be a Type field. If the field is determined to be a Type field, then it is compared with the predetermined value of the IEEE 802.1Q tag Type value as shown in step 76. If the Type field is determined to be the IEEE 802.1Q tag Type value then the VLAN tag is extracted from the frame as shown in step 78. If the Type field is determined to not be the IEEE 802.1Q tag Type value in step 76, then the Type Table 81 is employed, as shown in step 82, to determine if the Type is one of the fifteen predefined values which correspond to a specific Type such as Ipv4. Processing then continues using the field following the IEEE 802.1Q header treating the field once again as a Type/Length field as shown in step 80. If the field is determined to be a Type field, then the Type Table 81 is employed, as shown in step 82, to determine if the Type is one of the fifteen predefined values which correspond to a specific Type such as Ipv4.

If the field was determined not to be a Type field in either step 72 or step 80, but rather a Length field such as in the format DA/SA/Length/SNAP header, as shown in step 74, where the SNAP header begins with a destination Service Access Point ("DSAP") of 0xAA, Source Service Access Point ("SSAP") of 0xAA, and a Control Field of 0x03 then the Type field in the SNAP header is used to employ the Type Table 81 as shown in step 82, to determine if the Type is one of the fifteen predefined values which correspond to a specific Type such as Ipv4.

Referring to FIGS. 3 and 4, if the 16-bit Type field received in the frame matches one of the 16-bit Type values 84 programmed into the first fifteen entries of the Type Table 81 then a Protocol ID 86 and a Protocol VLAN index 88 is obtained from the first row in which there is a match. If such a match is not obtained then a default Protocol ID 86 and Protocol VLAN index 88 is retrieved from the sixteenth row 90 of the Type Table 81.

If the field was determined not to be a Type field in either step 72 or step 80, but rather a Length field such as in the format DA/SA/Length/Logical Link Control ("LLC"), as shown in step 74, an LLC Table 91 is employed by the Receive Header Processor 46 to perform a lookup operation as shown instep 92 to obtain a Protocol ID 86 and a Protocol VLAN index field 88. More specifically, each row in the LLC Table includes a Protocol ID field 86, a Protocol VLAN index field 88, a Destination Service Access Point ("DSAP") 94 and a Source Service Access Point ("SSAP") 96 field. If the 16-bit DSAP/SSAP field received in the frame matches one of the 16-bit DSAP/SSAP values, 94 and 96, programmed into the first fifteen entries of the LLC Table 91 then a Protocol ID 86 and a Protocol VLAN index 88 are obtained from the first row in which there is a match. If such a match is not obtained then a default Protocol ID 86 and Protocol VLAN index 88 are retrieved from the sixteenth row 98 of the LLC Table 91.

The protocol VLAN index obtained in either step 82 or step 92 is employed as a search key into the VLAN mapping Table 93 as shown in step 94. The VLAN mapping table is employed to map possibly non-unique VLAN information to a VLAN ID that is unique within the bridge/router. In particular, the Protocol VLAN index 88 obtained in either step 82 or step 92, the receive port, and VLAN tag extracted from the frame in step 78 are mapped to a unique 8-bit VLAN ID (from 0–255). Each row in the VLAN mapping table 93 includes a receive port indicator field, a receive tag field, a no-tag field, a Protocol VLAN index field, and a VLAN ID field. The VLAN mapping table is searched by receive port, receive VLAN tag and protocol VLAN index. The received VLAN tag is the IEEE or other tag value that was in the received frame. If no tag was contained in the received frame then a value of 0x0000 is used for the tag value and the no-tag value is set when searching the VLAN mapping table. If the frame has both an IEEE tag and another tag, the non-IEEE tag is used, but the frame is subsequently processed in software.

Once a matching row is located in the VLAN mapping table 93, the VLAN ID is employed as an index into a VLAN membership table 95 as shown in step 96. The VLAN membership table 95 is indexed by the VLAN ID. Each row of the VLAN membership table 95 includes a port mask field that indicates each valid port for the VLAN corresponding to the VLAN ID in the row. The port mask indicates the state of each physical port within the bridge/router with two bits per port and describes the spanning tree state of the ports. If any bit for a port is set then the port is considered a valid member of the VLAN. If the first bit is not set then that port is not considered a valid portion of the VLAN. The second bit is used to enable transmission for the respective port. Thus, transmission through the port is only allowed if both the first and second bits are set.

Each port in the bridge/router has a VLAN tag table 97 associated therewith. Each such VLAN tag table has 256 rows indexed by VLAN ID. The previously obtained VLAN ID and port number are employed to retrieve a new VLAN tag from each VLAN tag table corresponding to each port indicated by the port mask obtained from the VLAN membership table. The new VLAN tag is then written to the header portion of the frame before transmitting the frame out of the bridge/router as shown in step 100.

Receive Frame Processor 48 logic circuits support the above-described action and implement security features in different ways depending on the frame type. In the case of unicast bridged frames with a known DA the RFP 48 logic circuits verify that the receive and destination ports are in the VLAN membership table for that VLAN when VLAN security is enabled via a configuration register in the Receive Frame Processor 48 logic circuits. If VLAN security is not enabled then no VLAN information is employed because the port state is obtained from a Port Control Register ("PCR"). In the case of multicast (non-IP)/broadcast bridged frames the logic circuits access the VLAN membership table 95 to obtain the mask of ports to be flooded for that particular VLAN. The VLAN ID obtained from the VLAN mapping table 93 is also employed as an index into a VLAN tag table 97 for each port indicated in the VLAN membership table 95 to obtain a VLAN tag for the data unit as shown in step 98, which is supported by the logic circuits of the Transmit Header Processor 60.

In multibridge mode the Receive Frame Processor 48 logic circuits check the VLAN membership table to verify that the destination port in the Address Cache ASIC 26 lookup is in the forwarding state. If the port is not in the forwarding state then the frame will be processed in software. In single bridge mode, the transmit port state is checked against the Port Control Register ("PCR") 52 and the frame will likewise be forwarded to the FP if the port is not in the forwarding state. Each PCR maintains status information for the respective port with which the PCR is associated.

Such status information includes port state and filtering designators. In single bridge mode, when VLAN security is enabled the VLAN membership table is consulted to verify that the destination port is part of the destination VLAN.

Prior to transmitting the frame, the VLAN tag type is either added, removed, or modified based on the resultant lookup in the VLAN tag table 97.

Having described the preferred embodiments of the invention, other embodiments which incorporate concepts of the invention will now become apparent to those skilled in the art. Therefore, the invention should not be viewed as limited to the disclosed embodiments, but rather should be viewed as limited only by the spirit and scope of the appended claims.

What is claimed is:

1. A method for supporting Virtual Local Area Networks ("VLANs") with a bridge/router device having at least one port configured for operation with a data unit having a header portion including a Source Address field, comprising the steps of:

receiving the data unit via one of said at least one port;

examining the data unit with at least one logic circuit to determine an indicator of the port via which the data unit was received and to obtain an identifier associated with the data unit;

employing the receive port indicator and the data unit identifier together to obtain a virtual local area network identifier for the data unit; and employing the virtual local area network identifier to obtain a port mask, the port mask indicating output ports for the data unit; and employing, for at least one of the output ports indicated by the port mask, the virtual local area network identifier to obtain at least one virtual local area network tag to be included in the data unit when the data unit is transmitted.

2. The method of claim 1 further including the step of employing a protocol type indicator as the data unit identifier if a protocol type field with a protocol type indicator follows the Source Address field in the data unit header.

3. The method of claim 2 further including the step of employing a SNAP type indicator as the data unit identifier if a length field follows the Source Address field in the data unit header and the data unit header includes a SNAP header.

4. The method of claim 3 further including the step of employing a Destination Service Access Point indicator and a Source Service Access Point indicator as the data unit identifier if the length field follows the Source Address field in the data unit header and the data unit header includes a Logical Link Control header.

5. The method of claim 4, wherein the virtual local area network identifier is unique within the bridge/router.

6. Apparatus for facilitating support of Virtual Local Area Networks ("VLANs") with a bridge/router device configured for operation with a data unit having a header portion including a Source Address field, comprising:

at least one port via which the data unit is received;

a first logic circuit operative to obtain an indicator of each port via which the data unit is received;

a second logic circuit operative to examine the data unit received via said at least one port to obtain an identifier associated with the data unit header; and a third logic circuit operative to employ the receive port indicator and the data unit identifier together to obtain a virtual local area network identifier for the data unit;

a fourth logic circuit operative to employ the virtual local area network identifier to obtain a port mask, the port mask indicating output ports for the data unit; and a fifth logic circuit operative to employ, for at least one of the output ports indicated by the port mask, the virtual local area network identifier to obtain at least one virtual local area network tag to be included in the data unit when the data unit is transmitted.

7. The apparatus of claim 6 wherein said second logic circuit employs a protocol type indicator as the data unit identifier if a protocol type field with a protocol type indicator follows the Source Address field in the data unit header.

8. The apparatus of claim 7 wherein said second logic circuit employs a SNAP type indicator as the data unit identifier if a length field follows the Source Address field in the data unit header and the data unit header includes a SNAP header.

9. The apparatus of claim 8 wherein said second logic circuit employs a Destination Service Access Point indicator and a Source Service Access Point indicator as the data unit identifier if the length field follows the Source Address field in the data unit header and the data unit header includes a Logical Link Control header.

10. The apparatus of claim 9 wherein the virtual local area network identifier is unique within the bridge/router.

* * * * *